United States Patent [19]
Karlsten

[11] Patent Number: 5,690,249
[45] Date of Patent: Nov. 25, 1997

[54] MULTI-SECTIONED IMPROVED AIR SUPPLY COMPOST CONTAINER

[75] Inventor: Stephan Karlsten, Göteborg, Sweden

[73] Assignee: Grona J AB, Gothenburg, Sweden

[21] Appl. No.: 499,047

[22] Filed: Jul. 6, 1995

[51] Int. Cl.⁶ ..................................... B65D 6/24
[52] U.S. Cl. ................. 220/666; 220/4.26; 220/4.05; 220/501; 220/913
[58] Field of Search .................... 220/8, 666, 4.28, 220/4.26, 4.04, 4.05, 484, 501, 553, 555, 908, 913, DIG. 27; 47/66 R, 66 SC, 73 R; 71/9, 14

[56] References Cited

U.S. PATENT DOCUMENTS

| | | | |
|---|---|---|---|
| 4,060,945 | 12/1977 | Wilson. | |
| 4,153,176 | 5/1979 | Carson | 220/484 |
| 4,203,525 | 5/1980 | Okubo | 220/4.26 |
| 4,628,634 | 12/1986 | Anderson | 47/66 SC |
| 4,984,561 | 1/1991 | Warrington | 220/4.28 |
| 5,125,184 | 6/1992 | Anderson | 47/66 SC |
| 5,339,974 | 8/1994 | Raghunathan | 220/908 |

FOREIGN PATENT DOCUMENTS

| | | | |
|---|---|---|---|
| 2515477 | 5/1983 | France | 47/66 R |
| 1477323 | 5/1989 | U.S.S.R. | 47/66 SC |

*Primary Examiner*—Stephen J Castellano
*Attorney, Agent, or Firm*—Dvorak & Orum

[57] ABSTRACT

The invention concerns a compost container consisting of a number of ring-shaped container sections, constructed to be assembled, as well as of a ventilated base-plate and a lid. The purpose of the invention, to improve the air supply to the container's internal composting space, is achieved by a ventilation partition, a part of the base-plate, which together with the inside wall of the bottom-most container section and ventilation column to facilitate air supply to said internal composting space. The purpose of the invention is further achieved by ventilation openings and in the uppermost container section and the lid, respectively, which allow air to leave the container's internal composting space in a manner that can be adjusted by turning the lid.

9 Claims, 8 Drawing Sheets

5,690,249

MULTI-SECTIONED IMPROVED AIR SUPPLY COMPOST CONTAINER

BRIEF SUMMARY OF THE INVENTION

The invention relates to a compost container consisting of a number of ring-shaped container sections made of a plastic material and capable of being assembled as well as a ventilated base-plate and a lid.

An object of the present invention is to provide a compost container having an improved air supply to the container's internal composting space.

This purpose is achieved through a compost container characterized by a ventilation partition formed from a part of the base-plate's outermost edge laid against the inside of the wall of the bottom-most container section thereby forming a ventilation column therebetween to supply air to the container's internal composting space.

BRIEF DESCRIPTION OF THE DRAWINGS

The invention is described hereafter as a discussion of a practical model with reference to the attached drawings of which.

DETAILED DESCRIPTION OF THE INVENTION

Figure 1:
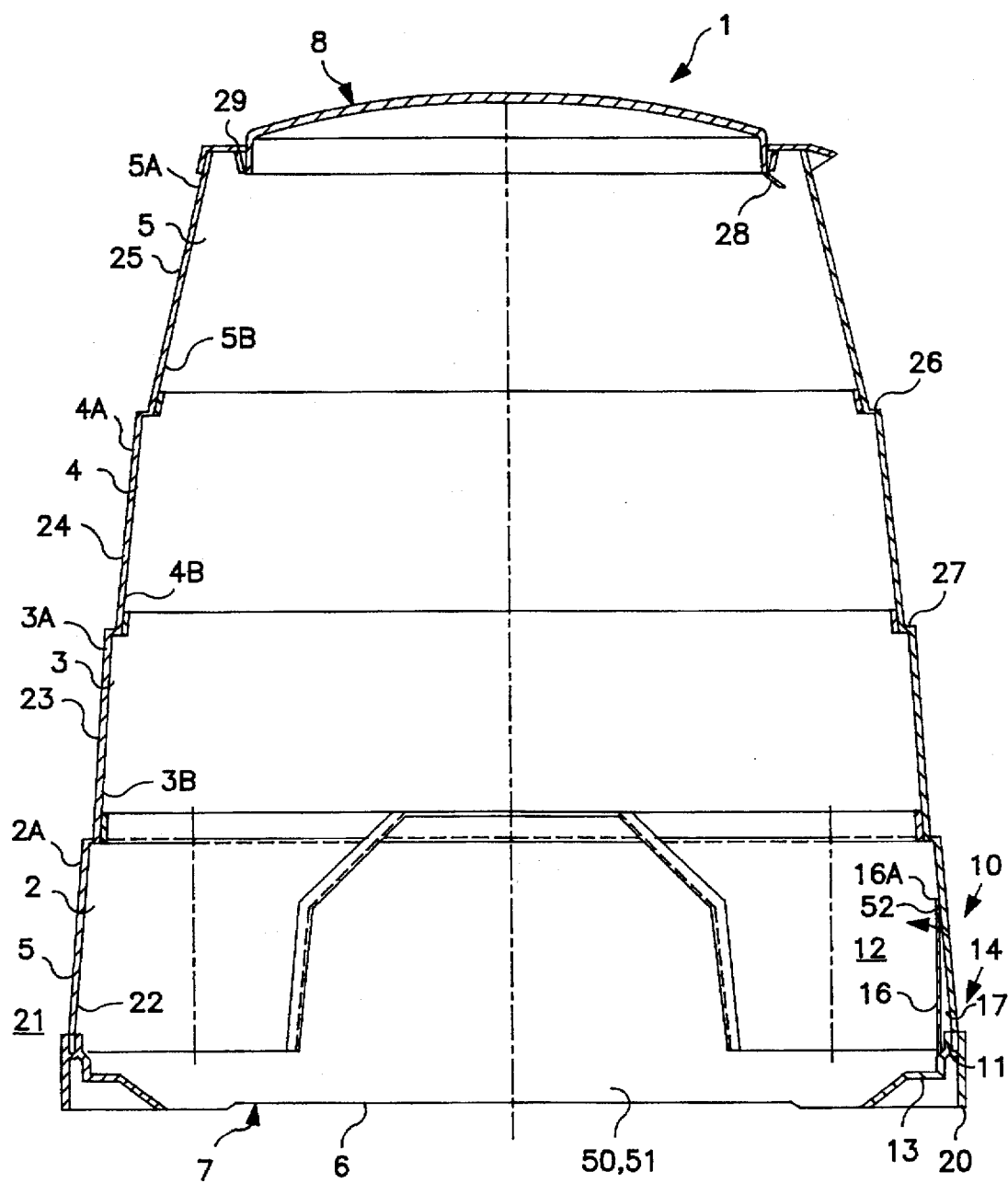
FIG. 1 shows the compost container in assembled cross-section form.
Figure 2:
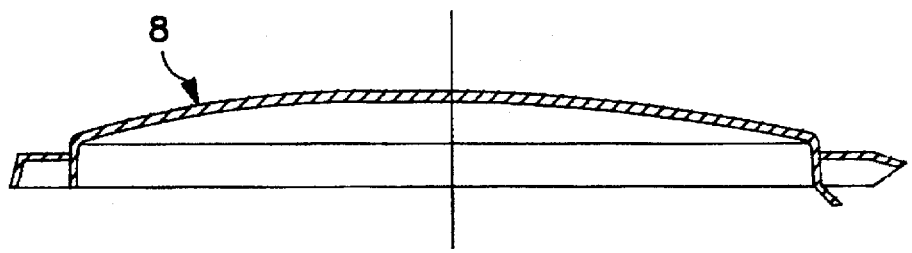
FIG. 2 shows a side-view of the container lid.
Figure 2A:
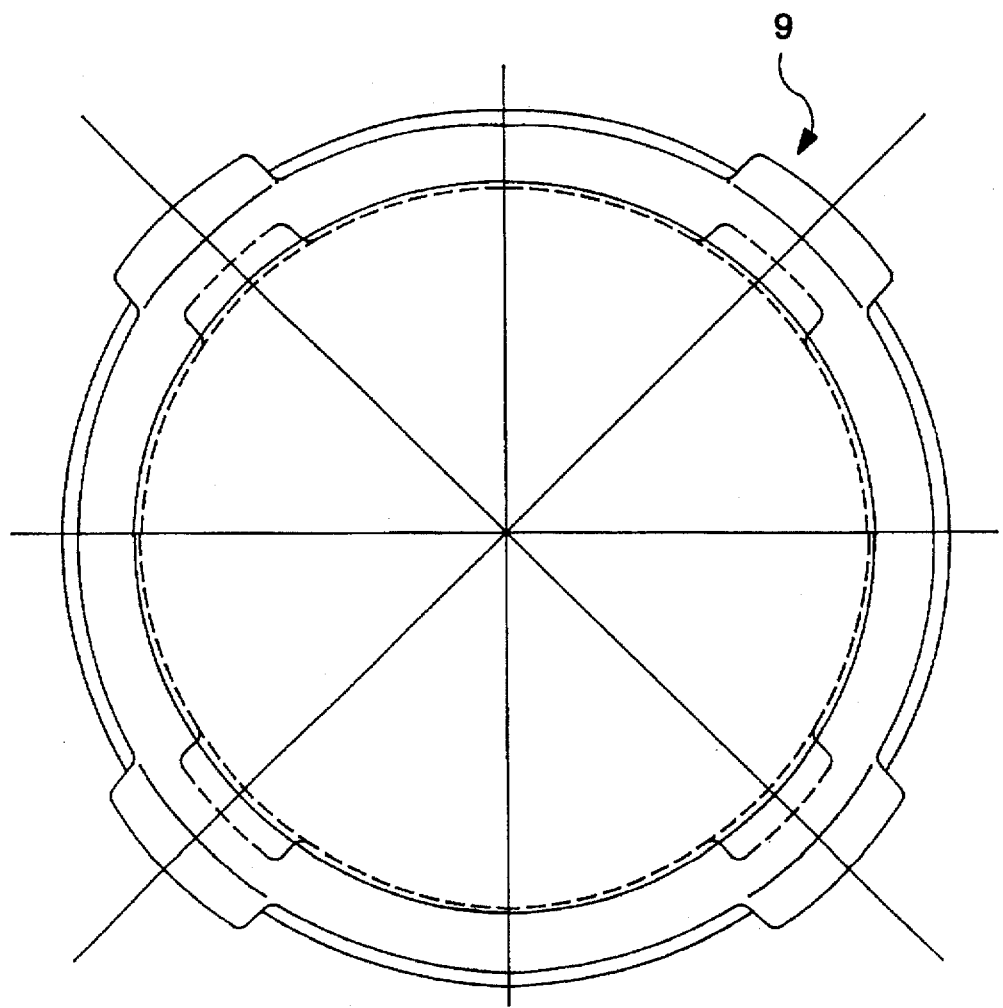
FIG. 2a shows a cross-section view, from above, of the container lid.
Figure 3:
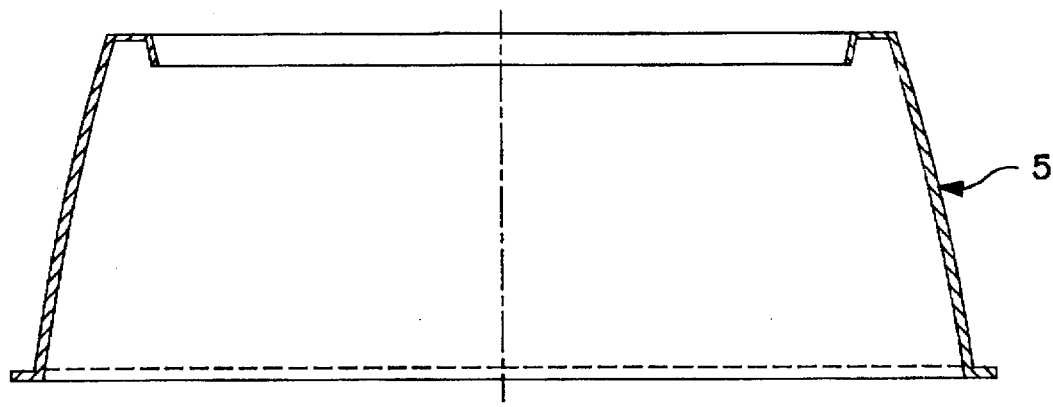
FIG. 3 shows a cross section of the container's uppermost section.
Figure 3A:
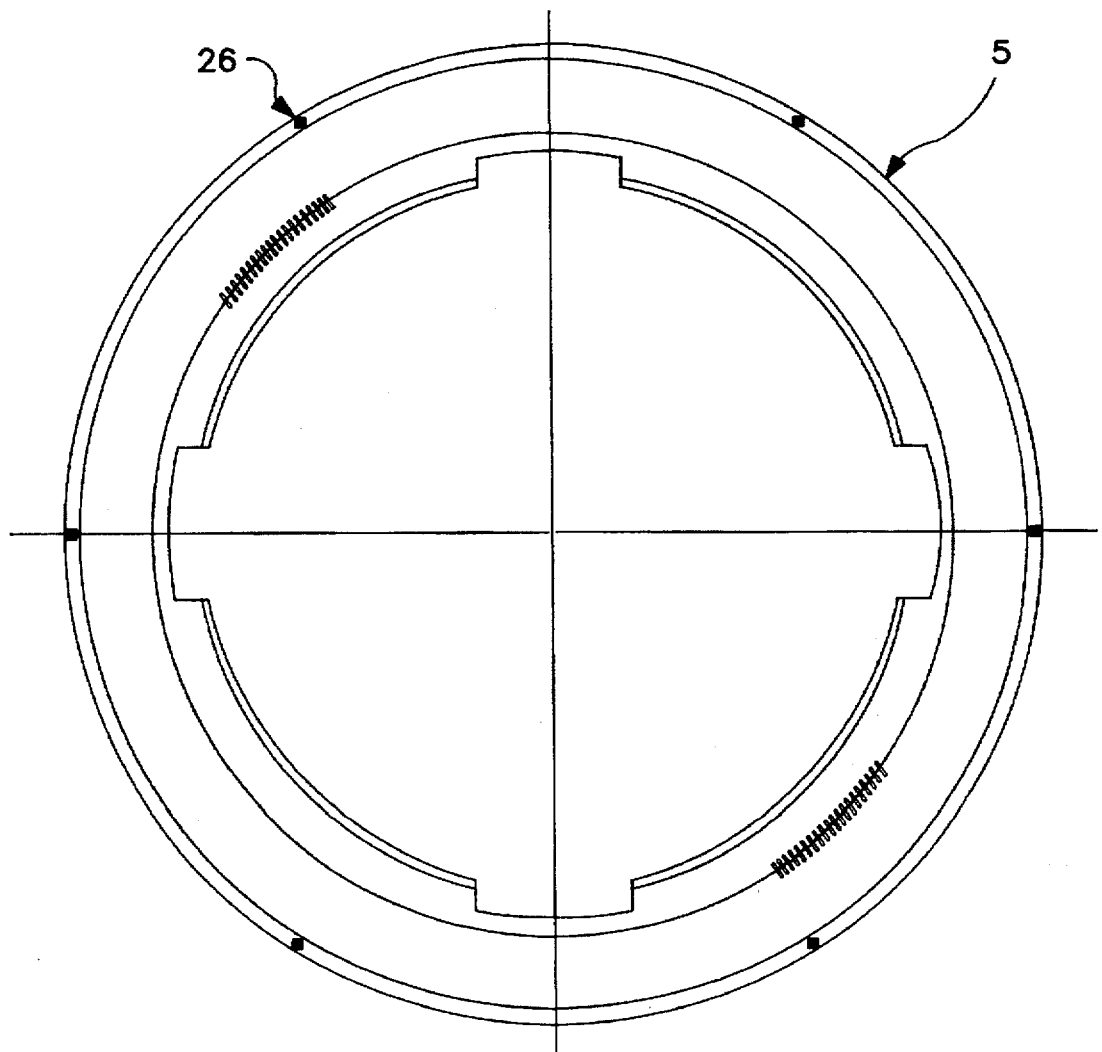
FIG. 3a shows a view from above, of the container's uppermost section.
Figure 4:
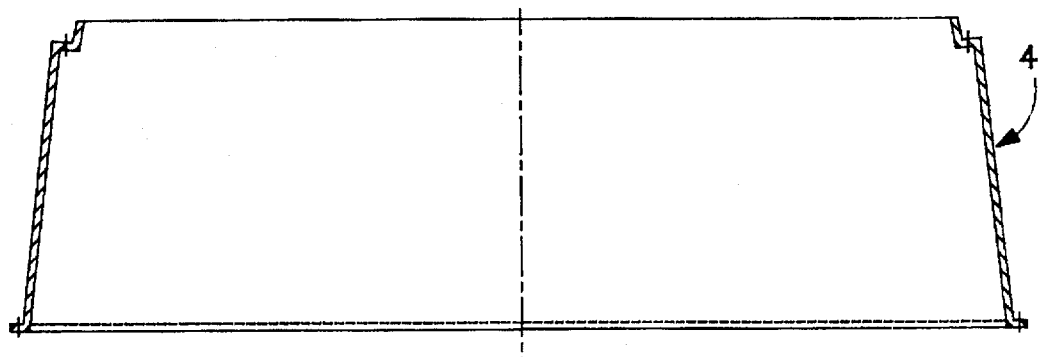
FIG. 4 shows a cross-section of the next uppermost section.
Figure 4A:
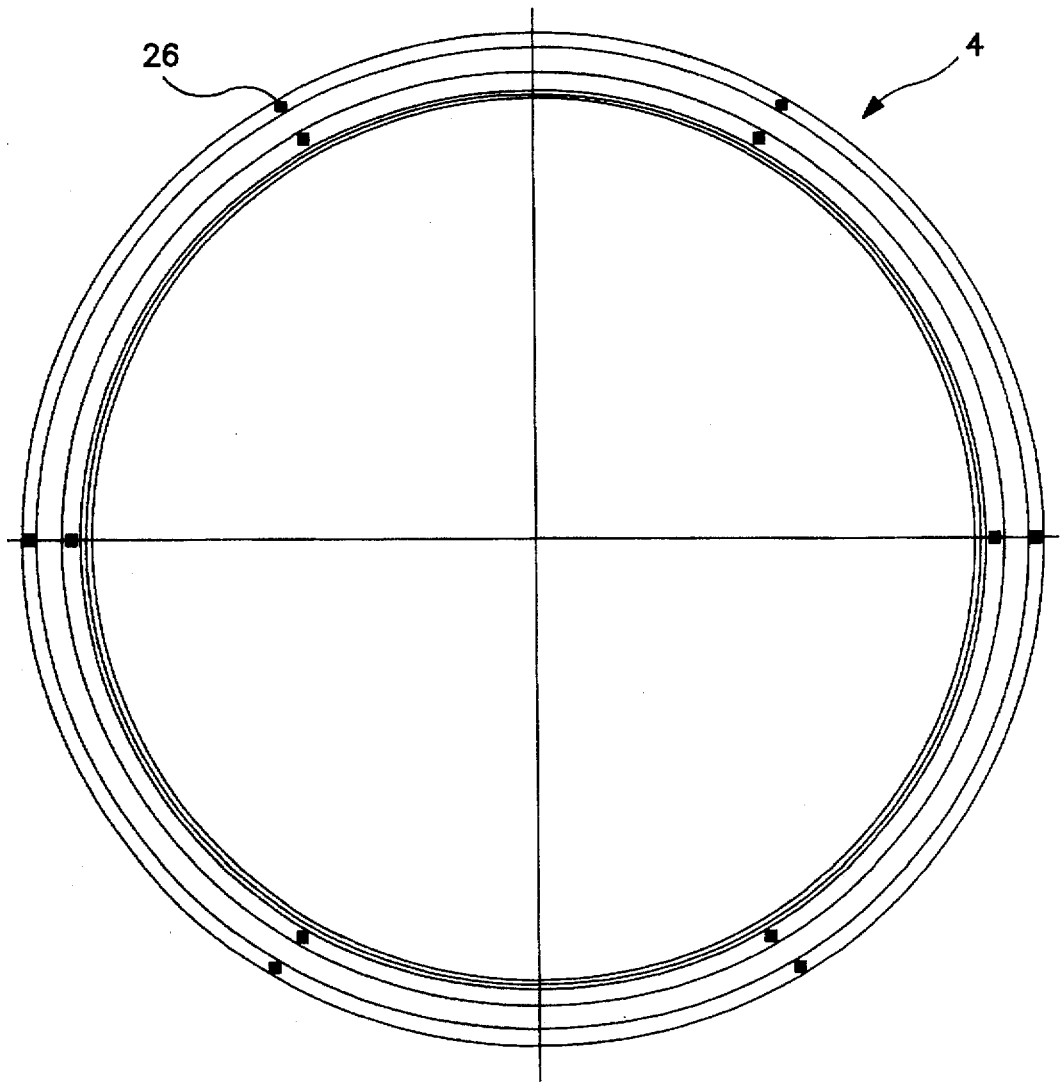
FIG. 4a shows a view from above, of the next uppermost container section intended for support.
Figure 5:
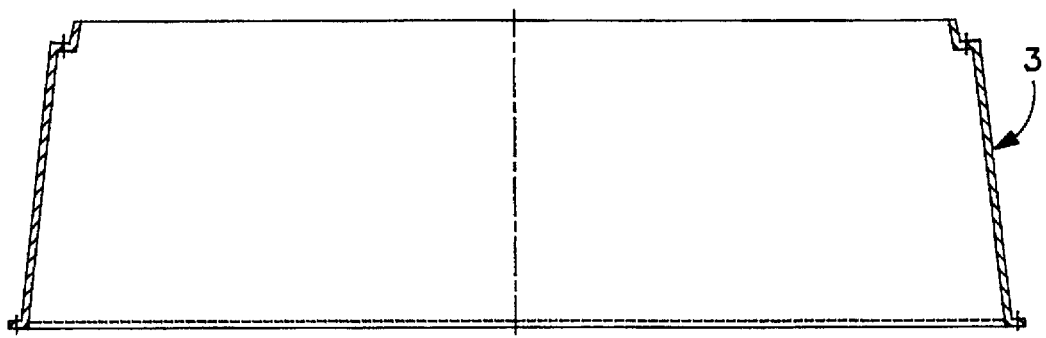
FIG. 5 shows a cross-section of the next bottom-most container section intended for support.
Figure 5A:
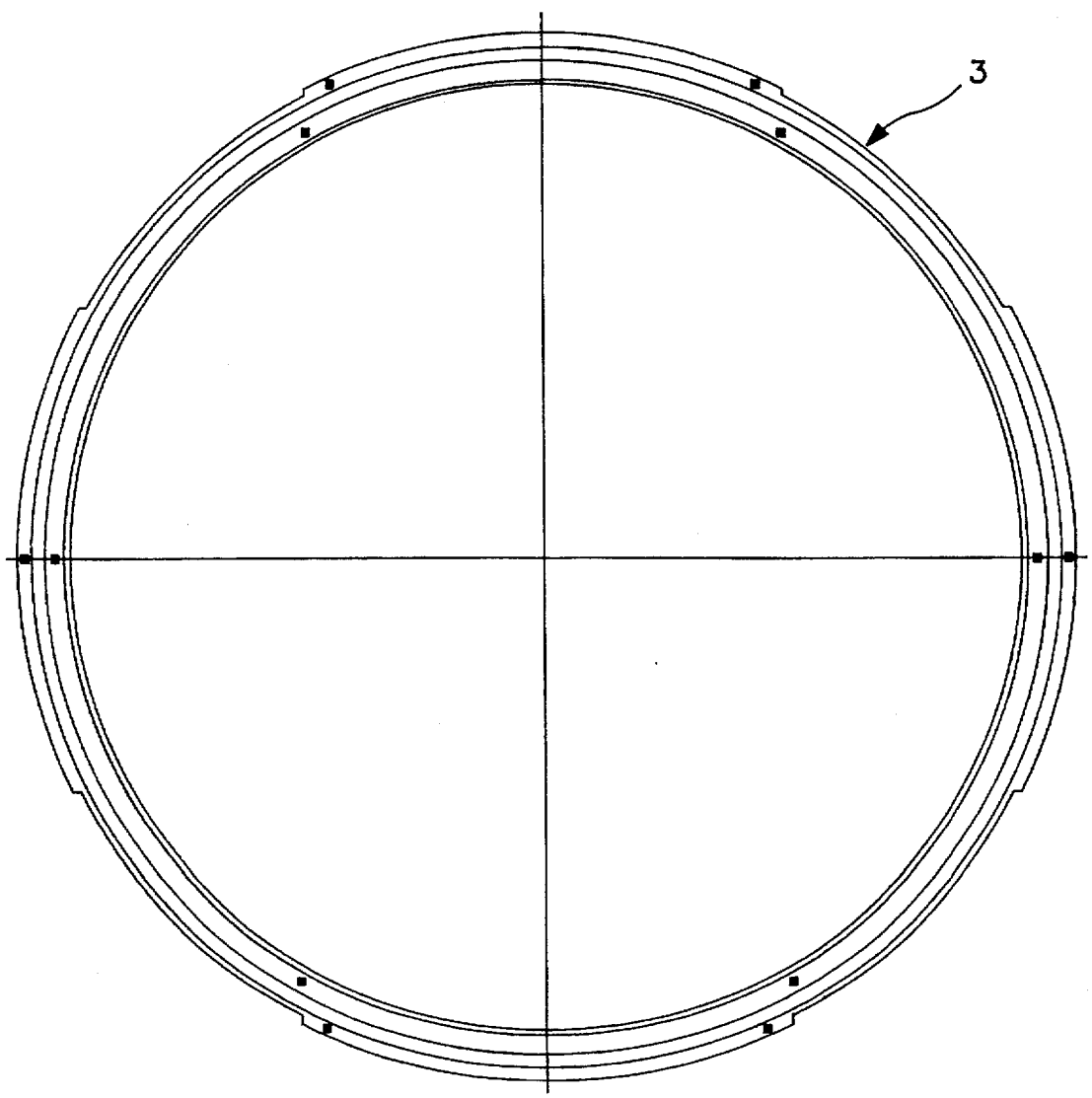
FIG. 5a shows a view from above, of the next bottom-most container section intended for support.
Figure 6:
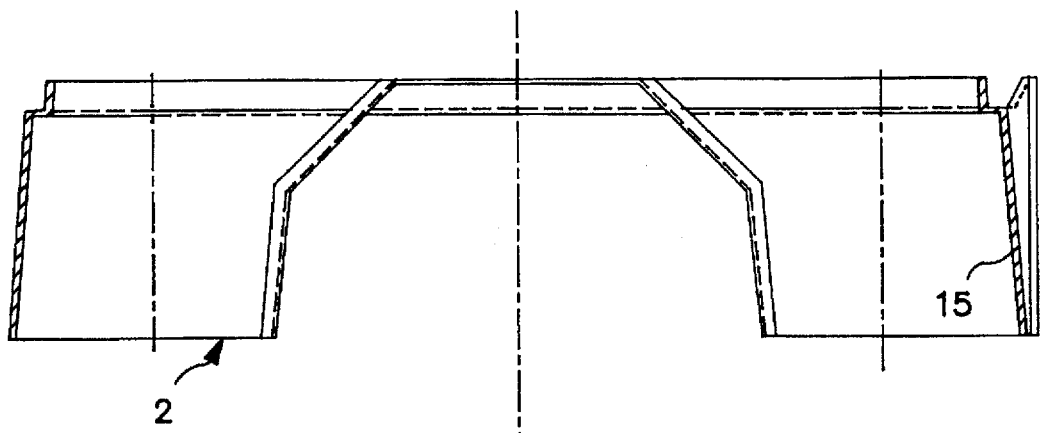
FIG. 6 shows a cross-section of the bottom-most container section.
Figure 6A:
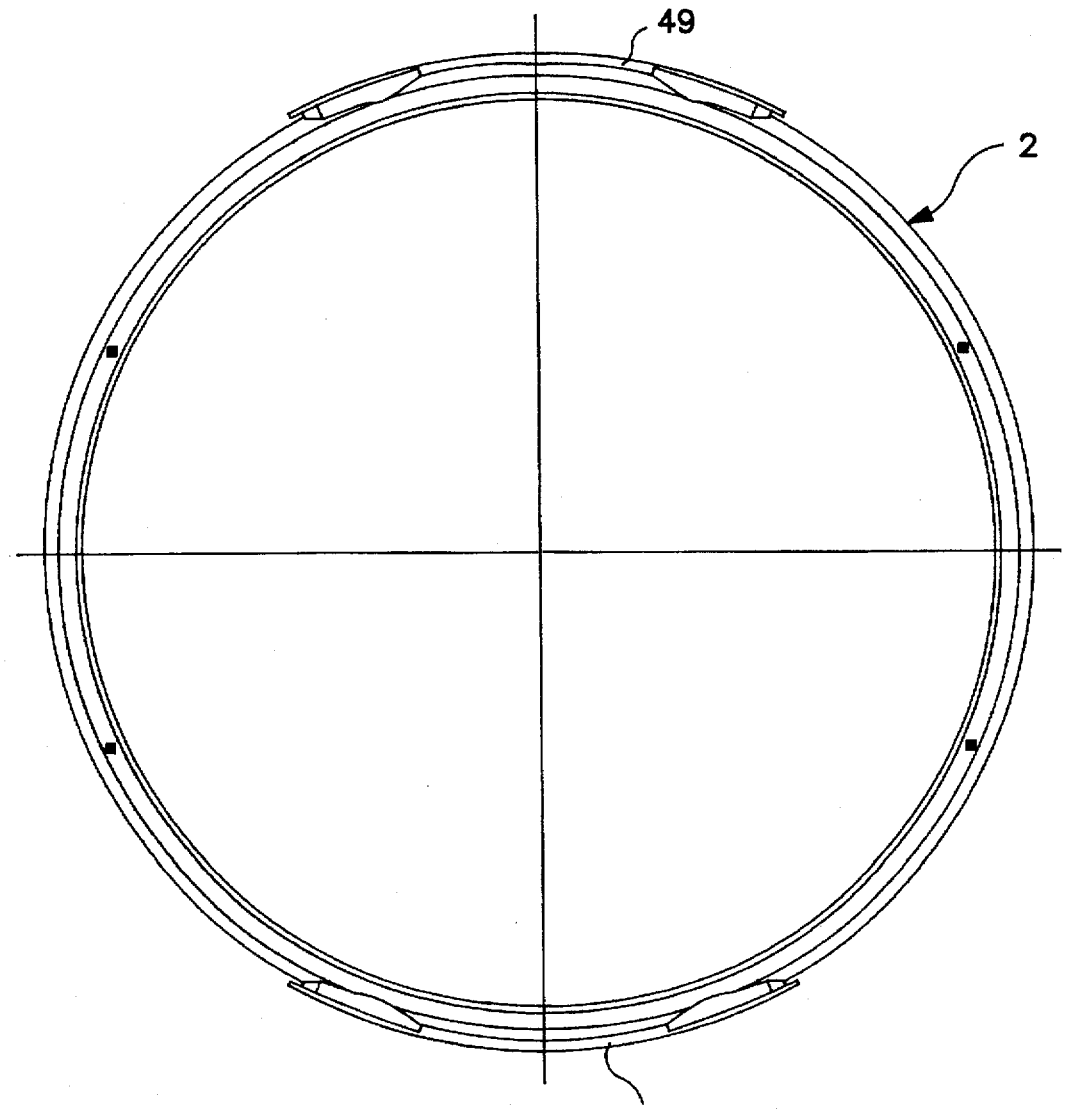
FIG. 6a shows a view from above, of the bottom-most container section.

The present invention relates to a compost container (1) consisting of a number of ring-shaped container sections (2–5) made of a plastic material capable of being coupled and assembled as a unit, a ventilating base-plate (7) with pervading openings (6), a lid (8) with ventilation openings (9), and a ventilation section (10) which facilitates air supply (11) to the container's internal composting space (12). More particularly, a ventilation column (17) is formed between a wall section (15) of the bottom-most container section (2) and an air-permeable ventilation partition (16) formed from a part of the base-plate's outermost edge (13).

Figure 7:
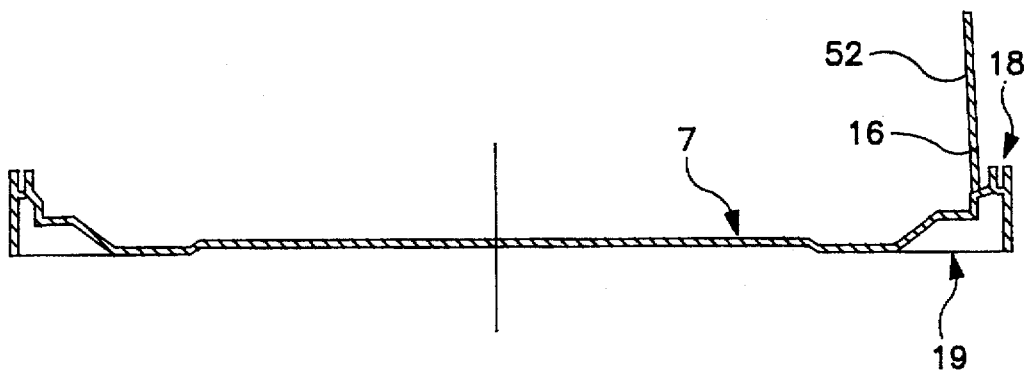
FIG. 7 shows a cross-section of the base-plate.
Figure 7A:
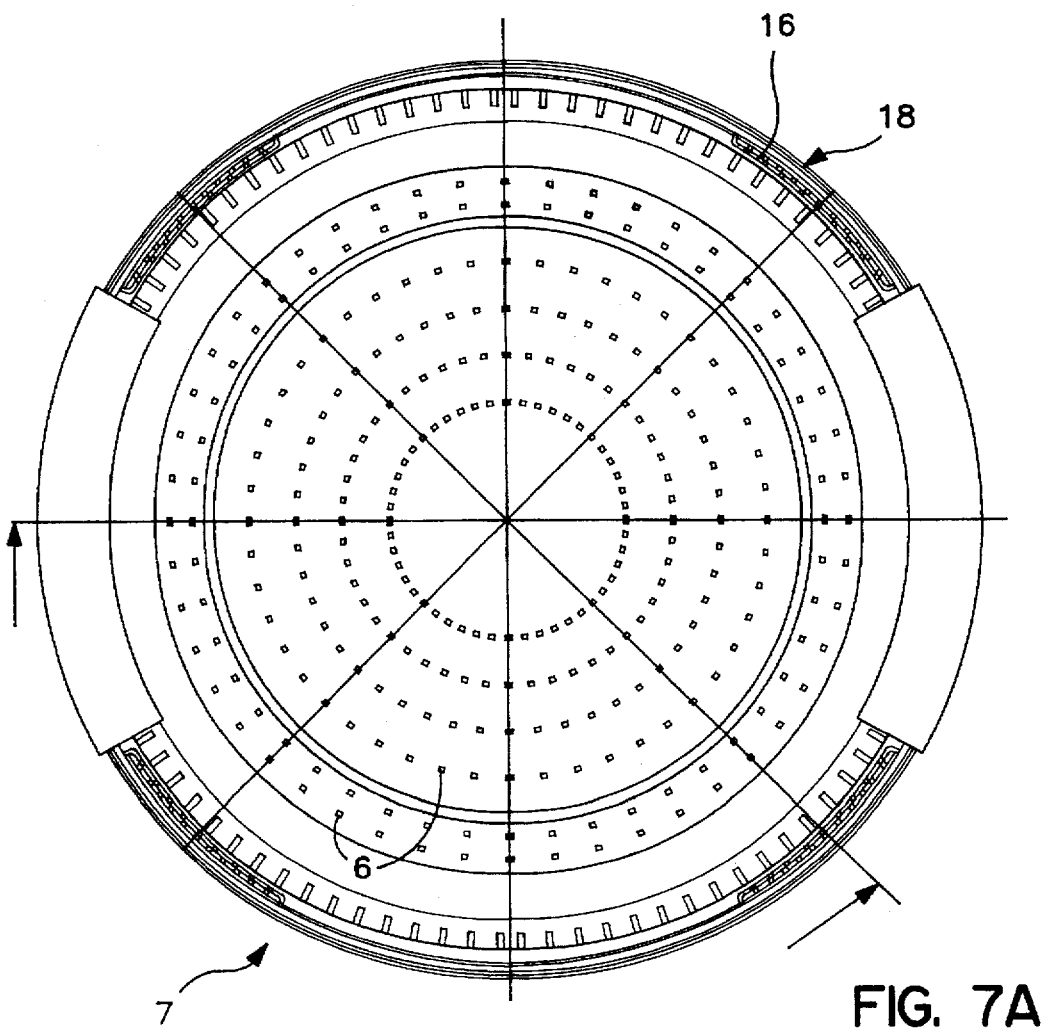
FIG. 7a shows a view from above, of the base-plate.

As shown in FIGS. 7 and 7a, the base-plate (7) has as an outer edge a column-shaped channel (18) which extends around the base-plate's (7) entire circumference and into which it is intended that the bottom-most container section's (2) wall section (15) be placed. This, together with a rise (19) in the base-plate's outermost edge facilitates effective air supply to the compost container (1). For the purpose of ventilation, a number of ventilation holes (20) are found in the rise (19) in the base-plate's outermost edge and extend from the outside of the container into the ventilation column (17).

The compost container (1) has in particular a number of ventilation partitions (16) distributed along the base-plate's outermost edge (14) as an incorporated part of said edge (14). The ventilation partitions (16) extend essentially vertically, meeting the inside wall of said container section (2) at the ventilation partition's respectively upper end (16A) where holes (52) are found which lead into the container's internal composting space (12).

The compost container (1) consists of a number of ring-shaped container sections (2–5) which have outwardly inclined walls (22–25), relative to the respective upper edges (2A, 3A, 4A, 5A) and the edges (2A, 3B, 3A, 4B, 4A, 5B, 5A) intended for coupling. In one embodiment, the edges can be stair-stepped and, respectively, angled out and have openings (26) that take, for example, self-threading screws (27).

In one embodiment, the lid (8) has fasteners in the form of a snap-lock (28) which makes it possible to fasten the lid (8) to the uppermost container section (5), yet allow it to be turned, while secured to the container (1). In this manner, air supply can be either increased or decreased into the container's composting space (12) via air vents (29) in the lid. Depending on the position of the air vents (29) in the lid (9), the ventilation openings (9A) are exposed to a greater or lesser extent. A number of the ventilation openings are found in the upper edge of the uppermost container section (5).

Figure 8:
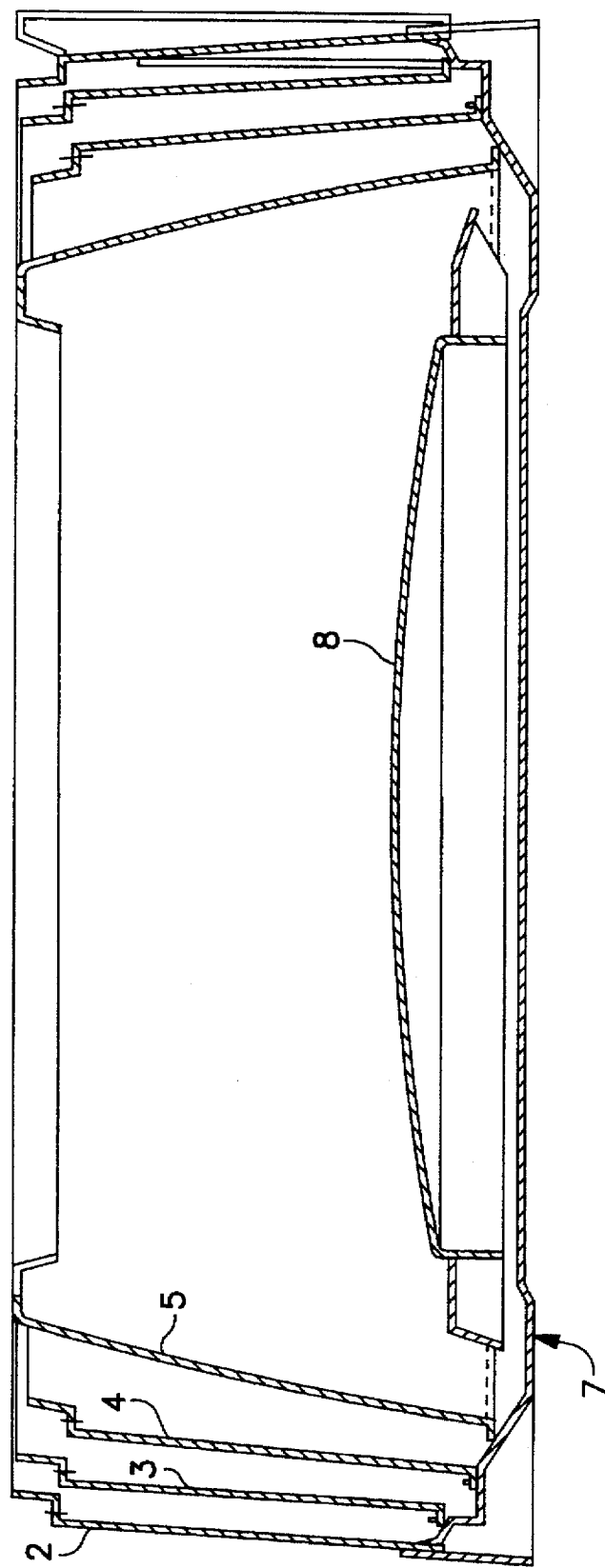
FIG. 8 shows all the container sections arranged for transportation and storage purposes, including lid and base-plate, placed together and shown in cross-section.

A compost container (1) of the sort the invention herein refers to can be transported packed together as, for example, is shown in FIG. 8, by setting the different container sections (3–5) one inside the other, including the lid (8), within the bottom-most section (2). All these are then set on top of a base-plate (7) section. The container sections (2–5) have inclined side walls and can be unpacked, screwed together with screws (27) and placed on a site intended for the assembled compost container. As shown in FIG. 1, vertically moveable doors (48, 49), that normally cover over the openings (50, 51) designed for emptying the container (1) and that are situated opposite to each other in the bottom-most section (2) can, when composted material has settled in the bottom of the container (1), be opened by sliding them upwards when the user wants to empty the container (1). Effective ventilation of the container (1) is now achieved thanks to the invention, which is not limited to the drawings shown or the descriptions of the practical model herein, but can be varied within the frame of the patent claims without abandoning the invention's idea.

What is claimed:

1. A compost container comprising: a plurality of ring-shaped interconnected container sections; a ventilated base-plate connected to a bottom-most ring-shaped container section, said ventilated base plate having a ventilation partition formed from an inwardly spaced outermost edge of the base plate which lies against an inside of a wall of the bottom-most container section thereby forming a ventilation column therebetween to supply air to an internal composting space of the container; a lid connected to a top-most ring-shaped container section;

a base plate edge having a rise and a column-shaped reception channel for a bottom-most container section casing; and a plurality of ventilation holes extending from the exterior of the compost container through the rise of the baseplate edge into the ventilation column.

2. A compost container according to claim 1, further comprising: a plurality of ventilation partitions distributed along the inwardly spaced outermost edge of the base plate.

3. A compost container according to patent claim 2, wherein said ventilation partitions extend essentially vertically and meet the inside of the wall of the bottom-most container section at a ventilation partition upper end.

4. A compost container according to claim 3, further comprising: a plurality of ventilation openings in an upper edge of an uppermost container section as well as a plurality of ventilation openings in the lid which allow air to leave, to a greater or lesser extent by turning the lid to varying positions, the container's internal composting space.

5. A compost container according to claim 1, wherein said interconnected container sections further comprise: inclined walls and edges intended for coupling.

6. A compost container as claimed in claim 1, further comprising: a plurality of ventilation openings disposed in the uppermost container section and in said lid to allow air to leave the container at a rate that can be adjusted by turning the lid.

7. A compost container according to claim 2, comprising more than one section having inclined walls and having edges intended for coupling.

8. A compost container according to claim 3, comprising more than one section having inclined walls and having edges intended for coupling.

9. A compost container as claimed in claim 1, which is made of plastic.

* * * * *